(12) United States Patent
Bach (10) Patent No.: US 9,574,885 B2
(45) Date of Patent: *Feb. 21, 2017

(54) PHYSICAL DISABILITY PROBES FOR GEOGRAPHIC INFORMATION

(71) Applicant: HERE Global B.V., Veldhoven (NL)

(72) Inventor: Jeffrey Bach, Aurora, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,534

(22) Filed: Aug. 12, 2015

(65) Prior Publication Data
US 2015/0345956 A1  Dec. 3, 2015

Related U.S. Application Data

(63) Continuation of application No. 12/748,710, filed on Mar. 29, 2010, now Pat. No. 9,109,908.

(51) Int. Cl.
| | |
|---|---|
| *G08G 1/123* | (2006.01) |
| *G01C 21/32* | (2006.01) |
| *A61H 3/02* | (2006.01) |
| *A61H 3/04* | (2006.01) |

(52) U.S. Cl.
CPC .............. *G01C 21/32* (2013.01); *A61H 3/02* (2013.01); *A61H 3/04* (2013.01)

(58) Field of Classification Search
CPC .............. G01C 21/32; A61H 3/04; A61H 3/02
USPC ........................................................ 701/532
See application file for complete search history.

(56) References Cited

U.S. PATENT DOCUMENTS

| | | | |
|---|---|---|---|
| 6,542,811 B2 | 4/2003 | Doi | |
| 7,050,903 B1 | 5/2006 | Shutter et al. | |
| 7,149,626 B1 * | 12/2006 | Devries .............. | G01C 21/3626 701/25 |
| 2004/0203349 A1 * | 10/2004 | Detweiler ............... | H04W 4/00 455/41.1 |
| 2007/0294023 A1 | 12/2007 | Arcot et al. | |

* cited by examiner

*Primary Examiner* — Maceeh Anwari
(74) *Attorney, Agent, or Firm* — Lempia Summerfield Katz LLC (57) ABSTRACT

Systems, devices, features, and methods for obtaining, enhancing, or using data for or with a geographic database, such as a navigation database, are disclosed. For example, one method includes receiving input to enable a probe sensor that is associated with a device used by a being with a physical disability. Geographic data is collected via the probe sensor when the device is in use by the being with the physical disability. The collected geographic data is provided to a data collection facility to develop data corresponding to a geographic and/or navigation database.

15 Claims, 4 Drawing Sheets

PHYSICAL DISABILITY PROBES FOR GEOGRAPHIC INFORMATION

This application is a continuation under 37 C.F.R. §1.53 (b) and 35 U.S.C. §120 of U.S. patent application Ser. No. 12/748,710 filed Mar. 29, 2010, which in incorporated by reference in its entirety.

BACKGROUND OF THE INVENTION

The present invention relates to collecting, generating, storing, and/or using data and, more particularly, to geographic probe data and uses thereof.

Navigation systems or devices may provide useful guidance or route information. For example, an end user navigation device may provide a display of a route and/or directions from an origin to a desired destination. Such navigation devices may use or rely on a geographic database that includes geographic data records representing a geographic region.

For example, in regards to vehicle navigation, road data segments or links and node data records corresponding to respective real-world roads and intersections are stored in a geographic database. These road segments and node data are retrieved when forming a navigation route from one place to another. As time goes on, new and different roads are built and/or existing structures may be modified. To accommodate for the changes as well as for general enhancement purposes, geographic databases are updated time to time.

However, such updates may involve a map developer driving and collecting geographic data of new streets or modified streets, or the map developer may rely on third party information. Time and cost may limit how much geographic data and types of data to be collected or provided. For example, data collection or acquisition may be focused on traditional streets and paths, which may not include data corresponding to handicapped or physical disability accessible paths or ways. Or, such collection of data corresponding to handicapped or physical disability accessible paths or ways may be time consuming or not as cost effective.

SUMMARY OF THE INVENTION

According to one aspect, a method of obtaining data for a geographic and/or navigation database is provided. For example, the method includes receiving input to enable a probe sensor that is associated with a device used by a being with a physical disability. Geographic data is collected via the probe sensor when the device is in use by the being with the physical disability. The collected geographic data is provided to a data collection facility to develop data corresponding to the geographic and/or navigation database.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
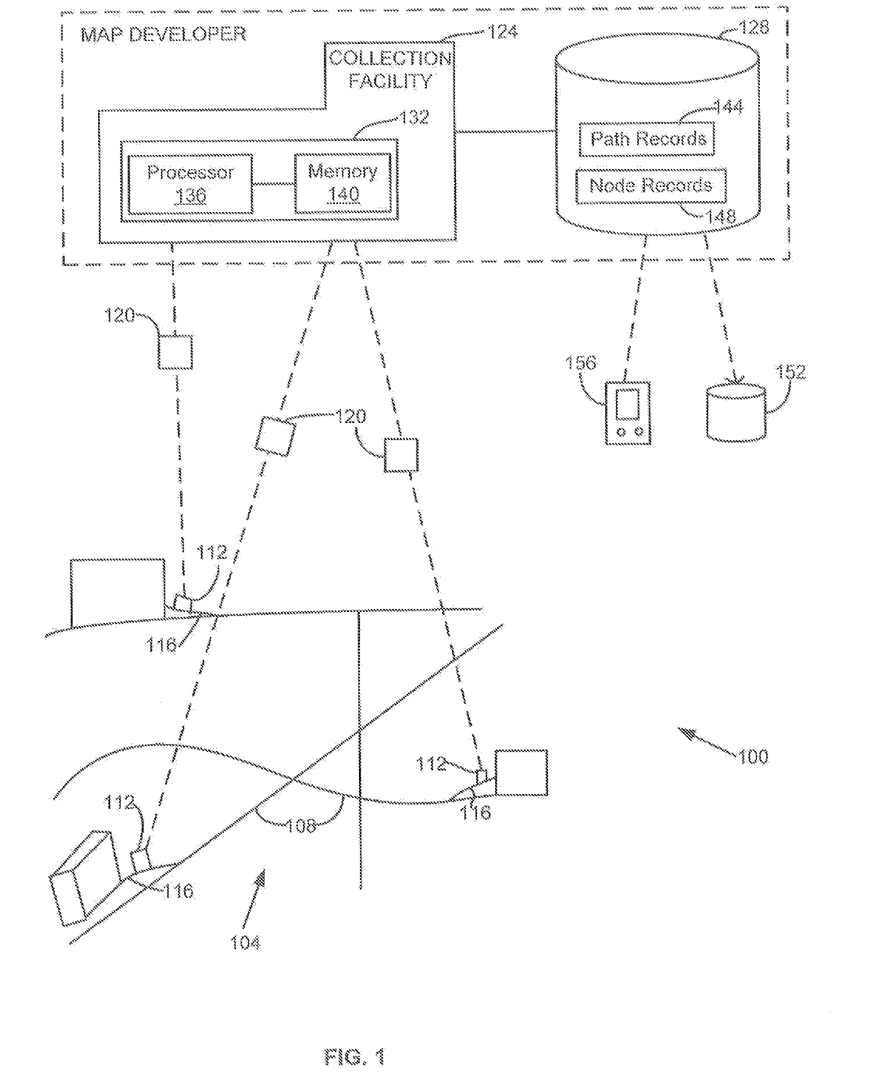
FIG. 1 is a diagram of an exemplary system for obtaining or providing data for a navigation and/or geographic database.

FIG. 1 shows one embodiment of a system 100 for obtaining and/or using probe data. The geographic data, probe, and/or navigation system 100 includes, but is not limited to, a geographic region 104, a road or path network 108, objects 112 traveling on paths 116, a data collection facility 124, a geographic and/or navigation database 128, a database product 152, and/or an end user device 156. Additional, fewer, or different components may be provided. For example, a proxy server, a name server, a map server, a cache server or cache network, a router, a switch or intelligent switch, additional computers or workstations, a user interface, administrative components (such as an administrative workstation), a gateway device, a backbone, ports, network connections, and/or network interfaces may be provided. While the components in FIG. 1 are shown as separate from one another, one or more of these components may be combined.

The objects 112 are probes or probe devices. For example, the objects 112 are vehicles, apparatus, and/or other devices for carrying probe sensors or probes that collect geographic data or other data. Alternatively, the objects 112 may be human beings (such as pedestrians) or animals carrying probe sensors, or the objects 112 may be the probe sensors themselves. In one embodiment, the objects 112 are physical disability devices, such as wheel chairs, crutches, walking sticks, or other devices that assist people with a physical disability with movement or to get around. A physical disability may include a physical handicap that impacts walking, sight, touch, hearing, or other physical sense, motion, or body part.

For example, the physical disability devices 112 may include or may be connected or attached with one or more probe sensors for collecting geographic and/or other data. For example, the physical disability devices or probes 112 move around or travel within the geographic region 104, and while traveling, the probes 112 collect geographic data and/or other data regarding their respective locations and/or surrounding area. The probes 112 may travel on or be transported on the path or road network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in the geographic region 104, such as a city, a suburb, a state, a country, and/or other geographic region. Alternatively, the region 104 represents one or more indoor areas, and the network 108 may be hallways or other open areas. Probe or data collection may or may not be activated while the probes 112 are on the path network 108. For example, if a person that uses a wheel chair is being driven to a certain location, the wheelchair or associated device may not be used to collect probe data during the drive and may start probe data collection when the wheelchair is in actual use. Alternatively, probe data collection may occur even during transport periods or at any other time.

Once the probe device 112 is in use, such as for assisting a being with a physical handicap or disability with movement, probe data collection may begin or continue. For example, the probe devices 112 collect geographic and/or other data when traveling or traversing handicap or physical disability access ways 116. The access ways 116 may be a wheelchair ramp, an elevator, a path designed to assist beings with physical disabilities, paths that are accessible by all individuals including the physically disabled (such as a sidewalk), and/or other path ways or access points. While the probe devices 112 are on or moving on the access ways 116, probe data is collected.

The probe data may be position data or information, geographic data, and/or other data relating to each respective probe 112. For example, each probe device 112 collects position information including latitude, longitude, and/or altitude coordinates, global positioning system ("GPS") trace data, and/or other position data. Other data such as surrounding information may be collected. In one embodiment, one or more images of surrounding areas may be captured, and/or a user of a respective probe device 112 may input information (such as text information of a sign or other geographic feature) as probe data. Speed or velocity data or information for each probe device 112 may also be collected. For example, how fast a probe device 112 is travelling (such as in miles per hour, kilometers per hour, or other units) as well as direction of travel may be detected and collected or sent as probe data. The speed or velocity data may be associated with one or more position data during or after collection.

The detected or collected probe data is sent or transmitted to the data collection facility 124. In one embodiment, the probe data is sent to the facility 124 via data packets 120. The data packets 120 may contain the collected probe data, ID information, header information, and/or other data. One or more signals carrying the data packets 120 may be used to send the probe data to the facility 124 via a wired or wireless network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The probe data may be sent substantially in real-time or at other times. In an alternative embodiment, instead of or in addition to transmitting the probe data directly from the probe or probe device 112, the probe data is stored on one or more computer-readable media, such as a CD-ROM, DVD, flash drive, hard drive, or other tangible media suitable to store data, that is sent to the facility 124 (e.g., via mail or uploaded to a website via a separate computer).

In one embodiment, the data collection facility 124 is owned and operated by a map, geographic, and/or navigation data developer, such as NAVTEQ North America, LLC located in Chicago, Ill. The term "map developer" may also include third-party contractors. The collection facility 124 may be one or more buildings, servers, workstations, computers, and/or other structure or equipment thereof for receiving and analyzing probe data or other data. For example, the facility 124 includes, houses, or is a processing device 132.

The processing device 132 receives and/or analyzes or is used to analyze the collected probe data. The processing device 132 is one or more servers, computers (such as a desktop tower or a laptop processing unit), processors, and/or other electronic processing systems or devices. The processing device 132 includes, but is not limited to, a processor 136 and a memory 140. Additional, fewer, or different components may be provided. For example, a user interface or workstation with one or more input devices may be included or in communication with the processing device 132.

The processor 136 is a general processor, application-specific integrated circuit ("ASIC"), digital signal processor, field programmable gate array ("FPGA"), digital circuit, analog circuit, or combinations thereof. In one embodiment, the processor 136 is one or more processors operable to control and/or communicate with the various electronics and logic of the processing device 132 and/or associated components or devices. The memory 140 is any known or future storage device. The memory 140 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 140 may be part of the processor 136. The memory 140 is operable or configured to store application software or logic as well as intermediate or process data files.

The processor 136 is configured or adapted to execute software or logic to receive, analyze, and/or use probe data from each of the probes or probe devices 112. In one embodiment, the processor 136 matches received probe data, such as via the data packets 120, with map data of the navigation or map database 128. For example, position data, such as GPS traces or coordinate information, is compared to existing map data records or other map related information to determine or update pathways used by beings with physical disabilities, such as via physical disability devices. Different probe data is managed and organized based on ID's relating to each probe 112. For example, position data and speed or velocity data from a single probe device 112 is associated with ID data of that probe device 112. Probe data from different probes 112 may be aggregated when comparing map data and/or for other operations.

Data records representing or corresponding to physical disability access ways may be generated based on the received probe data. Other types of data may be included or associated with the physical disability path data records. For example, speed or velocity, such as an average speed or average velocity, may be determined for different path ways or portions thereof and may be stored or linked with the respective data records. Also, surrounding geographic information, such a sign information, image data, and/or description information may be included or associated with the respective data records. Furthermore, various data attributes may be associated with generated physical disability data records. For example, a physical disability attribute representing a wheelchair, walking impairment, or other disability or related device may be linked or associated with a data record that corresponds or represents a respective path or access, such as a wheelchair ramp or access way.

Generated data records corresponding to handicap or physical disability accessible paths may be stored in or associated with the geographic and/or map database 128. The map or navigation database 128 may be a master geographic or navigation database that contains data that represent geographic features in a coverage area, such as the geographic area 104. The coverage area may correspond to an entire country, such as the United States. Alternatively, the coverage area may correspond to several countries, such as the United States, Canada, and Mexico. According to another alternative, the coverage area may represent only a single region within a geographic area, such as a country, state, province, or city. Or, the coverage area may represent one or more indoor areas.

In one embodiment, the geographic or map database 128 includes data used for navigation-related services. For example, the geographic database 128 includes path segment data records 144 and node data records 148. Other data records such as, but not limited to, routing data, maneuver data, cartographic ("carto") data, and point-of-interest ("POI") data may also be included. Map or navigation data other than segment and node data may be provided.

The path segment data records 144 are links or segments representing roads, streets, or paths. The node data records 148 are end points corresponding to the respective links or segments of the path or road segment data records 144. The path segment data records 144 and the node data records 148 may represent a road or path network, such as the path network 108. In one embodiment, the data records or data may represent navigation information for indoor areas (such as pedestrian paths or open areas) as well outdoor areas.

The road or path segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, etc. The geographic database 128 may include data about the locations of these POIs. The geographic database 128 may also include data about places, such as cities, towns, or other communities, and other geographic features, such as bodies of water, mountain ranges, etc. Such place or feature data may be POI data or may be associated with POIs or POI data (such as a data point used for displaying or representing a position of a city). The geographic database 128 may include other kinds of information.

Accordingly, the stored data or map records corresponding to the physical disability access ways or paths may complement and/or enhance the map database 128. For example, path segment records and/or node records of the physical disability paths or access ways/points generated via the probe data may be associated or connected with road/path segments and/or nodes currently existing in the map database 128, such as for navigation-related purposes.

The geographic database 128 may also be maintained by the map developer. The master geographic database 128 may be stored in a format that facilitates updating, maintenance, and development. The database 128 may be in any GIS or map-related file format, such as GDF or Shapefile, or in any other text or binary file format. For example, the master geographic database 128 or data in the master geographic database 128 is in an Oracle spatial format or other spatial format, such as for development or production purposes. The Oracle spatial format or development/production database may be compiled into a delivery format, such as a GDF format.

In one embodiment, an end user device 156 may be in communication with the map database 128 and/or with other components of the map developer such as via a cellular and/or server network or other wireless or wired network. For example, the end user device 156 may communicate with the map developer for navigation-related functions and/or services, such as route calculation, route guidance, map display, speed calculation, distance and travel time functions, and/or other functions. The navigation-related functions may correspond to vehicle navigation, pedestrian navigation, and/or other types of navigation. Navigation related functions or services regarding physical disability access ways or points are provided. The end user device 156 is an in-vehicle navigation system, a personal navigation device ("PND"), a portable navigation device, a cellular telephone, a mobile phone, a personal digital assistant ("PDA"), a watch, a computer, and/or other device that can perform navigation-related functions, such as digital routing and map display. In one embodiment, the navigation device 156 is a cellular telephone, such as a cellular telephone provided by Nokia Corporation located in Espoo, Finland.

In another embodiment, the data in the production and/or delivery formats of the map database 128 may be compiled or further compiled to form geographic database products or databases, such as the geographic database 152. For example, geographic data is compiled (such as into a PSF format) to organize and/or configure the data for performing navigation-related functions and/or services, including navigation features relating to physical disability access ways or paths. The compilation to produce the database 152 may be performed by a party or entity separate from the map developer. For example, a customer of the map developer, such as a navigation device developer or other end user device developer, may perform compilation on a received geographic database in a delivery format to produce one or more compiled navigation databases 152. The database 152 may be supplied to and used in an end user device, such as similar to or different than the end user device 156.

Figure 2:
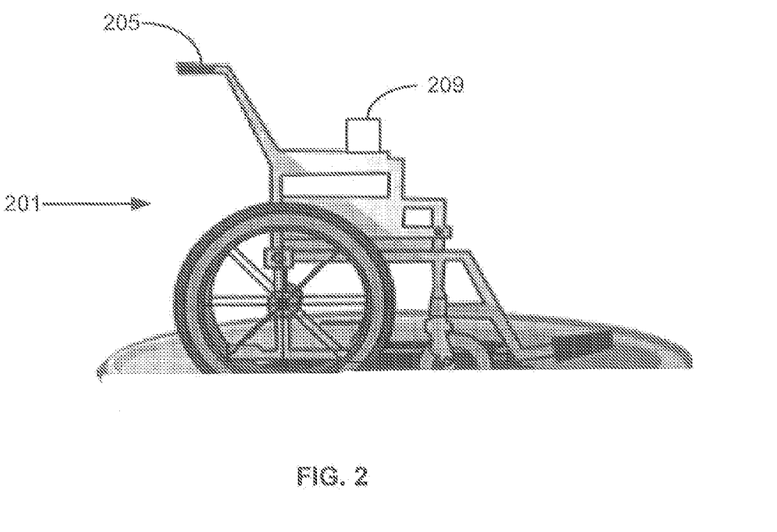
FIG. 2 illustrates an embodiment of a probe or probe device used in the exemplary system of FIG. 1.

FIG. 2 illustrates an embodiment of a probe or probe device 201, which may be similar or different than the probes 112. For example, the probe 201 includes a physical disability device 205 and a probe sensor 209. Additional, fewer, or different components may be provided. In one embodiment, the physical disability device 205 is a wheelchair. In other embodiments, the device 205 may be a walking stick, crutches, or any other device configured to assist a being having a physical disability with movement. Alternatively, the device 205 may be any device used by a being with a physical disability. For example, the device 205 may be a backpack or other structure for carrying or supporting the probe sensor 209. Or, the device 205 may be substituted with assistant beings, such as a guide dog or other animal.

The probe sensor 209 is attached, connected, or associated with the device or object 205. For example, the probe sensor 209 may be removably attached or integrally attached with the device 205. Alternatively, the device 205 and the sensor 209 may be combined as one device. The probe sensor 209 may be one or more positioning systems or devices (such as GPS units, WiFi components, positioning components or device used for indoor positioning, and/or a local positioning system), mechanical and/or electrical sensors, one or more gyroscopes, one or more direction sensors, and/or other system or device for providing or obtaining position data. In another embodiment, the probe sensor 209 or other sensor associated with the device or object 205 may be one or more cameras, speed or velocity detectors, accelerometers, laser devices (such as a LIDAR device), and/or other detectors.

The probe sensor 209 may be included in or may be a navigation user device, such as a PND or other navigation system. In one embodiment, the probe sensor 209 collects position data, such as a GPS trace and/or coordinate information, when the device 205 is being used or at other times.

For example, when a person is using the wheelchair 205 to get around, such as going through a wheelchair ramp or other physical disability access way or path, the probe sensor 209 collects position data to be sent to the facility 124 as probe data. The probe sensor 209 or other sensor may collect other types of data, such as speed or velocity data. The user of the device 205 and/or the probe sensor 209 may be able to control when and where to collect data, or the collection may be automated. Also, the user of the device 205 and/or the probe sensor 209 may be able to input the type of disability he or she has so that the collected data is associated with a specific disability. Or, the user may input, generally, that he or she has a physical disability.

Figure 3:
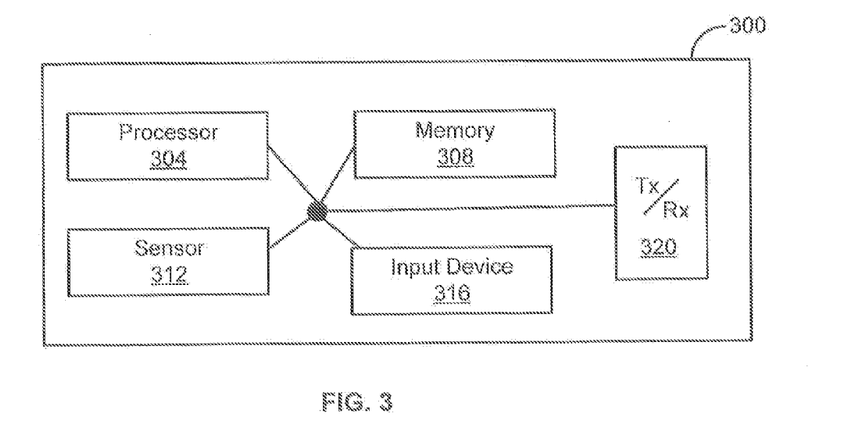
FIG. 3 illustrates an embodiment of components of a device.

FIG. 3 illustrates an embodiment of a device 300 and/or components thereof. The device 300 may be similar to the probe 201 and/or the device 209. For example, the device 300 may represent the whole probe 201 or portions thereof, such as the device 209 (e.g., the device 300 may represent a navigation device or other device used as a probe sensor or detector). The device 300 includes, but is not limited to, a processor 304, a memory 308, a sensor 312, an input device 316, and transmitter and/or receiver components 320. Additional, fewer, or different components may be provided. While the components in FIG. 3 are shown as separate from one another, one or more of these components may be combined.

The processor 304 is similar to or different than the processor 136. The processor 304 sends commands to the various devices or components to collect, receive, and/or transmit data and synchronizes or manages the different components. Also, the processor 304 is configured to associate and store data in the memory 308. The memory 308 is similar to or different than the memory 140.

The input device 316 is also in communication with the processor 304. The input device 316 may be one or more buttons, keypad, display, keyboard, mouse, stylist pen, trackball, rocker switch, touch pad, voice recognition circuit, or other device or component for controlling or inputting data in one or more of the components of the device 300. The sensor 312 is one or more sensors or detectors (or components thereof) as described above regarding the device 209. The transmitter and/or receiver components 320 may be wireless transmitter and/or receiver components (such as an antenna and/or power amplifier), wired connections or ports, or other components for data communication, such as for transmitting collected probe data and/or receiving other types of data or information.

Figure 4:
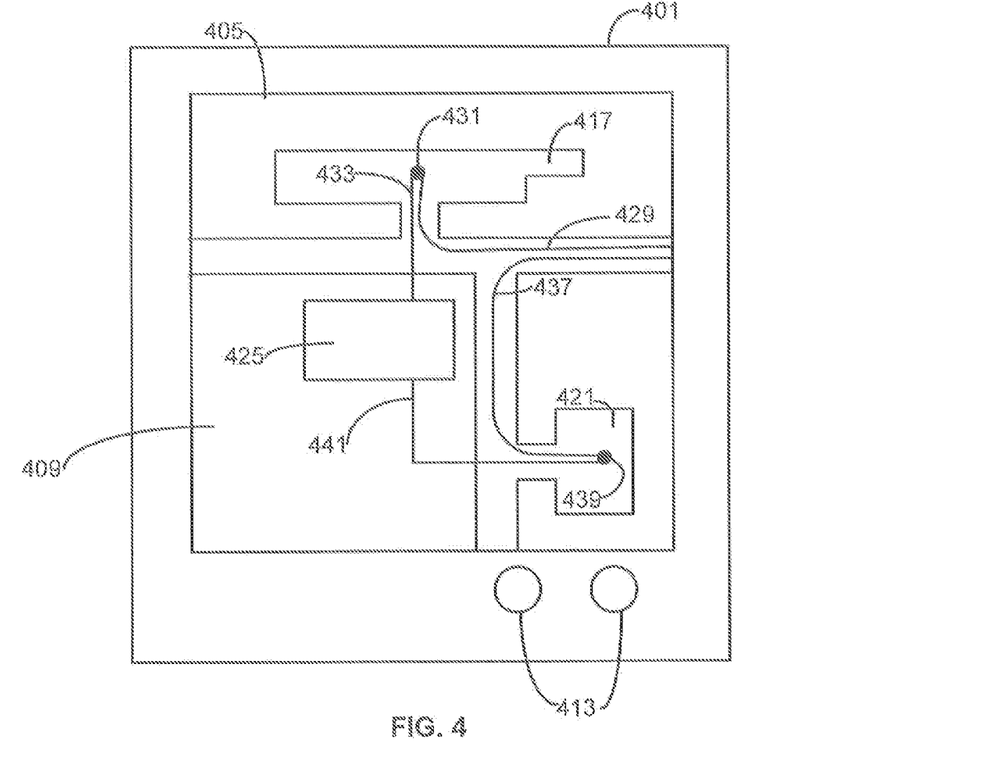
FIG. 4 illustrates an exemplary user device and display thereof associated with the exemplary system of FIG. 1.

FIG. 4 illustrates an exemplary device 401 and a graphic representation 409 thereof. For example, the device 401 is an end user device, such as the end user device 156 and/or the device 209 or 300. The device includes, but is not limited to, a display 405 and an input device 413. Fewer, additional, or different components may be provided. For example, the device 401 may include a database product like the database product 152. Alternatively, the device may communicate with a map developer or components thereof to retrieve map data, such as from the map database 128.

The display 405 is any mechanical and/or electronic display positioned for accessible viewing in, on, or in communication with the device 401. For example, the display 405 is a touch screen, liquid crystal display ("LCD"), cathode ray tube ("CRT") display, a plasma display, or other display. The display 405 may act as a hardware implementation of a user interface or a portion thereof. The input device 413 may be similar or different than the input device 316.

In one embodiment, the device 401 displays one or more graphic features of the graphic representation 409 via one or more images or presentations. For illustration purposes, multiple routes are shown on one screen, but each of the routes may be shown separately. In one embodiment, an end user may use the device 401 for route guidance. For example, a destination and/or origin are entered into or determined by the device 401, and, as a result, a route portion 429 showing a guidance path along a road to a point 431 is shown. The point 431 represents or corresponds to a parking lot 417 or a portion thereof. Then a route portion 433 is shown. The route portion 433 represents a pedestrian path from the point 431 to a building 425 or entrance thereof (which may be the main destination). The pedestrian path may not be suitable for a person or being with a physical handicap or disability. For example, the path may include overcoming a curb or walking up or down stairs.

In another embodiment, an end user that has a physical disability or is with a person or being with a physical disability uses the device 401 for route guidance. The end user may enter the type of physical disability, such as walking impaired, sight/vision impaired, hearing impaired, or other impairment (or just enter "wheelchair," "crutches," "walking stick," or other physical disability assistant device), or may just choose routing for a physical disability in general. Alternatively, a physical disability may be detected by the device 401. For example, an accelerometer or other component may detect different motions associated with walking, riding in a wheelchair, using crutches, using a cane, and/or other physical disability indicators (such as a strong limp) and then automatically select routing for a corresponding specific physical disability or a physical disability in general. Also, the end user enters a destination and/or origin for navigation or the device 401 determines the destination and/or origin. Then, the device 401 shows a route portion 437 as a guidance path along roads to the point 439. The point 439 represents or corresponds to a different parking lot 421 or a portion thereof. Then a route portion 441 is shown. The route portion 441 represents a physical disability accessible path or way to the building 425 or entrance thereof. This route path or portions thereof is based on map data generated or enhanced by collected probe data from physical disability probes, such as the probes 112 or the probe 201.

Accordingly, different routes are generated based on whether someone has a physical disability or not. For example, FIG. 4 shows that a route may be generated including the parking lot 417 that is closer to the destination and allows a more straight forward path to the building 425 from the parking lot 417. However, if one's physical disability is taken into consideration, a route may direct someone to the parking lot 421 that is farther away from the building 425 but is associated with a physical disability access path to the destination (which may not be as straight forward but does avoid stairs or other obstacles). Also, indoor routing may be provided. Furthermore, as an end user with a physical disability uses the device 401 for route guidance, the device 401 may act or continue to act as a probe device or sensor to collect probe data, such as for enhancement or update purposes or other purposes.

Figure 5:
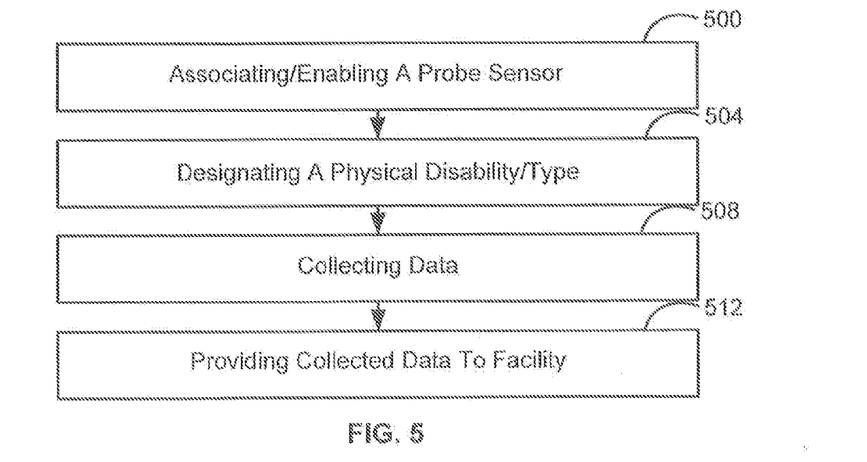
FIG. 5 is a flowchart of an exemplary method for obtaining or providing data for a navigation and/or geographic database.

FIG. 5 is a flowchart of an exemplary method for obtaining and/or providing data, such as for a navigation and/or geographic database (like the database 128). Fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

For example, an end user with a physical disability may use a device. The end user or other entity may associate one or more probe sensors, such as the device 209 and/or the sensor 312, with the device and/or enable the probe sensor (Step 500). The device may be a physical disability device that assists the user with movement, such as the device 205. Alternatively, the device may be a backpack worn by the user or other support or device. The end user can physically attach the probe sensor to the device. Or, the probe sensor may already be attached or connected with the device. Also, the probe sensor allows for enablement. The end user or other entity may turn on the probe sensor for data collection when the associated device is in use or at any other time (such as during transport of the associated device). Enablement may be achieved based on at least logic and features of the probe sensor or associated device (e.g., the probe sensor may receive an input, such as from the user, other entity, or the device itself, to be enabled via hardware and/or software features). In one embodiment, enablement may be location, time, and/or motion based.

A physical disability type may be designated and/or received by the probe (Step 504). For example, before, during, or after data collection via the probe device, the end user or other entity may designate or input a type of physical disability associated with the user. In one embodiment, a person that uses a wheelchair may enter or input the term "wheelchair" into the probe sensor or associated device. Or, the user may enter or input "walking-impaired" as a type of disability. In another embodiment, the user is prompted or supplied with a list of options to select from, and the options list different types of disabilities or physical disability devices. The input or selection of a physical disability ID or type data allows collected data to be associated with that specific type. The type information may be used to generate attribute IDs or data corresponding to specific map data records that represent suitable access ways or paths for one or more specific type of physical disability (e.g., this may be advantageous during route calculations). Alternatively, the user or other entity may input or select an indication of a physical disability in general, instead of or in addition to a specific type. Also, instead of or in addition to the user entering a physical disability input, a physical disability may be detected by the probe or associated device. For example, an accelerometer or other device may detect different motions associated with walking, riding in a wheelchair, using crutches, using a cane, and/or other physical disability indicators (such as a strong limp), and using this information (such as correlated with data from known disability cases), probe data may be collected and classified without the user having to provide the specific input.

Probe data is collected, such as when the end user is using the physical disability device or other device associated with the probe sensor (Step 508). For example, when the probe sensor and/or other sensor(s) is collecting geographic and/or other data, the user and/or device thereof acts as a probe, such as the probe 112 or 201. In one embodiment, at least one, ten, one hundred, one thousand, one hundred thousand, one million, one hundred million, or other number of probes may be used to collect data. The probe data may be collected while the end users are using the respective physical disability or support devices. Or, the probe data may be continuously or periodically collected at any time. In one embodiment, probe data collection is accomplished by people carrying on with their normal lives (such as running errands, going to a desired destination, and/or any other activity unrelated to active data collection) and are not hired or not actively trying to collect geographic or other data. For example, the people or devices thereof may collect data without even knowing that they are collecting data (e.g., the data collection may be a background process).

Position data (such as latitude, longitude, and/or altitude coordinates or GPS trace data), surrounding image data, inputted text or information, speed or velocity data, time or time stamp data and/or other data may be collected. In one embodiment, position coordinate and/or GPS trace data is collected, such as via the device 209 or the sensor 312. Also, speed or velocity data may be acquired. For example, the rate of movement and/or associated direction information for each probe or probe device is captured. This rate data may be averaged over a distance and then captured or collected as one value, or the rate data may be collected at certain time intervals or distance intervals associated with a given path. Furthermore, time stamps may be obtained or captured for speed calculation or other purposes. Also, one or more images or videos, inputted text or voice information, laser data, and/or other geographic or probe data relating to the users location and/or surrounding may be collected.

Organization of the collected data may occur during or after collection. For example, an ID, such as a data identifier associated with each respective probe or probe device, may be used to arrange collected data. In one embodiment, position, speed or velocity, attribute or type and/or other data for a specific probe or probe device is stored as one or more files associated with a specific ID representing that specific probe or probe device.

The collected geographic and/or probe data is then provided to a data collection facility, such as the facility 124, and/or a map developer (Step 512). For example, collected and associated data may be transmitted to the facility via one or more wireless and/or wired connections or networks, such as via the data packets 120. The data may be transmitted in substantially real-time or some other time. In one embodiment, data is wirelessly sent as each probe is moving along a path or at another time. Alternatively, the data is uploaded to a website or server via a physical connection. Or, physical data storage media containing the collected data is mailed or sent to the facility by the probe user or other entity, such as a third party supplier (e.g., a supplier of physical disability devices). The collection facility and/or map developer uses the probe data to develop, enhance, and/or compare with a map database, such as the database 128, or data thereof.

Figure 6:
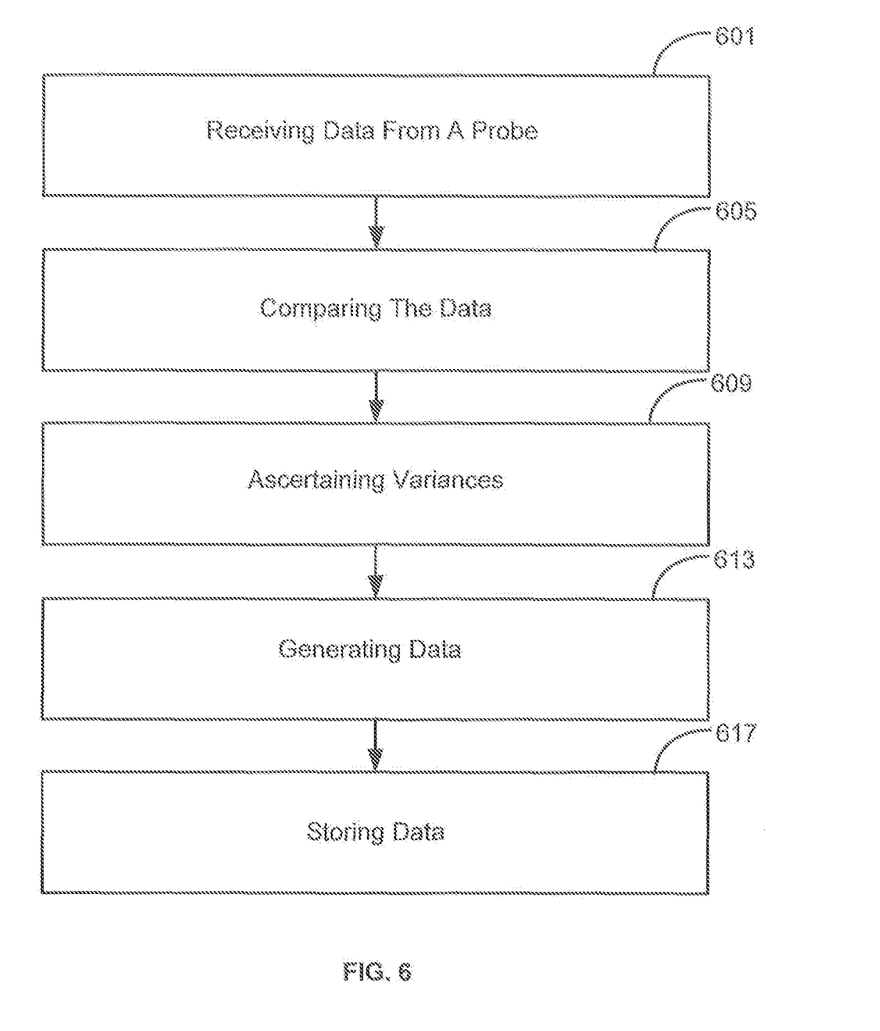
FIG. 6 is a flowchart of an exemplary method of enhancing or using data with a navigation and/or geographic database.

FIG. 6 is a flowchart of an exemplary method of enhancing or using data, such as related to a navigation and/or geographic database (like the database 128). Fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

In one embodiment, a data collection facility, such as the facility 124, and/or map developer receives probe data from one or more probes or probe devices, such as the probes 112, the probe 201, the probe sensor 209, and/or the sensor 312 (Step 601). For example, data or data packets, such as the data packets 120, are received. The received data may be received in an aggregated format or the facility may aggregate the data, such as based on ID information, position information, and/or other information. In one embodiment, the facility may aggregate or average probe data from different probes that relate to same or substantially the same paths or access ways or portions thereof. Also, the facility may compute average speeds or velocities regarding a certain path or portion thereof based on collected data from multiple probes.

The received data or portions thereof are compared with map data or related information of a geographic region (Step 605). For example, aggregated or separate position data of the probes is compared with road or path segment data records, node records, and/or other map data, such as existing data stored in or associated with the map database 128, for one or more regions. GPS traces from probes may be overlaid, superimposed, and/or compared to known or existing roads or paths to discover what new, modified, or different paths are being used by people with one or more physical disabilities. Such comparisons may be accomplished via manual visual detection using a workstation and/or via automated detection processes. Map matching processes and/or any known or future comparison techniques may be used.

Variances based on the comparison are ascertained, such as to determine new or modified pathways corresponding to one or more physical disabilities (Step 609). For example, while comparing probe data (or portions thereof) with map data, variances or diversions of the probe data from the existing map structure may be noticed or identified. These variances may represent new or modified paths or access ways corresponding to a physical disability, such as a wheel chair ramp or other path or way. Any known or future technique for identifying variances from map data may be utilized.

Geographic or map data records are generated, such as based on the comparison and/or the variance identification (Step 613). The generated data records represent the identified physical disability or handicapped access ways or paths. For example, the generated data records may be path segment records, node data records, carto records, and/or other map or geographic data/information that corresponds to physical disability paths or structures thereof. Speed or velocity data, such as average speed or velocity data, may be associated with the generated data, such as with each respective path segment record. The speed data may be used for calculating respective arrival times, expected travel times to a destination (e.g., speed probe data is used to determine travel times or how long it takes to travel on one or more road segments or routes), and/or for other navigation-related features. Also, collected time data or time stamps may be associated with the generated data or used to allow for better calculation of speed over a long distance and possibly enable some other features (such as identifying areas on a route that are difficult to navigate and cause very slow speeds, e.g., a turnstile). Any known or future techniques to create or generate map data records may be used.

The physical disability data may be attributed with one or more physical disability designations. For example, some data records may be attributed with a type designation, such as wheelchair, crutches, or walking stick and/or walking impaired, sight impaired, or hearing impaired. Alternatively, a general physical disability or handicap designation may be used. The attribute designation may be based on input data associated with respective probe data (such as probe data designated with a specific and/or general disability type via an input from the probe or probe user) or may be based on the fact that the probe data is coming from a probe associated with a physical disability. The attribute designation or ID may be used to retrieve the associated data when forming a route that wants to include one or more paths that are suitable for the specific type, such as a path suitable for a wheelchair, or for a physical disability in general.

Other data, such as image data or text/information data may also be associated with the generated data records. Also, the generated data records corresponding to physical disability paths or accesses may be existing data records that are modified or enhanced. For example, instead of or in addition to changing position data or structural representations of a path for the physically disabled, the map record is enhanced with more associated data or information, including preference and/or trend information, or is attributed with a physical disability ID or other attribute. For example, existing data records (such as data representing a path that can be used by people with physical disabilities and/or other people) are attributed as physical disability data records so that routing applications know what records may be used to generate routes or paths that are accessible by a person with a specific or general physical disability. Also, data records may be attributed as data records that represents paths or portions thereof that are not accessible by a person with a specific or general physical disability (but the lack of a physical disability ID or attribute for a data record may suffice as an indication that this data record represents a path that is not suitable for a person with a specific or general physical disability).

The generated, modified, and/or enhanced physical disability map data records are stored (Step 617). For example, the facility or map developer may store the new or modified data in the same database used for other map data records, such as the geographic database 128. Known or future techniques for storing map data records may be used. Alternatively, the new or modified data records are stored in one or more different databases. Data links and associations between existing map data records or related information and the newly generated and/or modified data records are created. For example, look-up-tables, indexes, tree structures, and/or other data file associations may be used when storing and organizing the generated physical disability data records in relation to the main or associated map database or associated information.

The different steps, acts, or processes of the methods described herein may be mixed and matched. Also, other methods, such as a product-by-process method or use methods, may be provided based on the disclosure herein.

Accordingly, the map database and/or uses thereof may be enhanced with important data records corresponding to physical disability paths and access ways based on probes as described herein. The enhanced database may be used to provide navigation-related features or functions, such as via the end user device 156 or 401 and/or via the database product 152. In one embodiment, end users with a physical disability may be provided with route guidance and/or other navigation features, such as shown by the device 401. Furthermore, the device 401 or other navigation systems or devices being used by the physically disabled or associated entity may also act as probes or probe devices to continue to enhance map data or related data.

Alternatives

The embodiments described herein focus of physical disabilities or physical disability devices. In alternative embodiments, the techniques and systems described herein may be used with child transport devices (such as strollers), baggage (such as rolling luggage), shopping carts, and/or other devices or transports that may require special access points, ways, or paths relative to general paths or access ways.

As described above, probe data, such as GPS traces, may be compared with map data records representing a geographic region. Alternatively, instead of or in addition to comparing the probe data to map data, the probe data corresponding to physical disability probes may be compared with other probe data, such as common vehicle or pedestrian probe data collected for traffic or other purposes. For example, probe data from vehicles on the road or pedestrians that are not associated with a physical disability are compared to the probe data from the physical disability probes. This comparison may identify different trends and variances to figure out common paths shared by both groups and/or respective paths or access ways or points used more by one group than the other group. Map data records of the database 128 may be used in the comparison as well, such as a reference when comparing both groups of probe data. Also, probe data of a group may be considered as map data of one or more regions.

Furthermore, the embodiments described herein focus on using the system 100 as a probe collection system to enhance map data. Alternatively, instead of or in addition to using the system 100 and associated device and/or methods for probe collection for map development per se, the system 100 and components or processes thereof may be used for traffic messaging and/or traffic updates. For example, the probe data from the physical disability probes may be used to determine traffic quantity and flow for respective paths used by the physically disabled. Accordingly, the facility 124 may act as a central or other traffic center that receives traffic probe data and then broadcasts traffic messages back to the users that act like probes and/or other users subscribed to the traffic messages. This way, people with physical disabilities can know what the traffic conditions are for certain areas or paths used by the physically disabled. This may be accomplished by at least the position and/or speed or velocity data provided by each probe. The probes may send ID information with the position, speed or velocity data, and/or other data to the traffic facility. Then the facility may generate location reference codes to broadcast, such as under the RDS-TMC system or standard. Description and details on the process of using probe data for traffic messaging may be provided in the United States Patent, U.S. Pat. No. 7,050,903, entitled METHOD AND SYSTEM FOR DEVELOPING TRAFFIC MESSAGES, which is hereby incorporated by reference. In another embodiment, the probes or probe devices may determine the respective location reference codes based on their specific location at any given point, and such location reference codes are transmitted to the traffic facility to reduce processing at the traffic facility as well as protect the identity of the probe or probe user (because ID information may now not be needed by the traffic facility). Such anonymous traffic messaging techniques may be provided in the United States Patent Application Publication, U.S. 2007/0294023, entitled TRAFFIC DATA COLLECTION WITH PROBE VEHICLES, which is hereby incorporated by reference.

Also, in an alternate embodiment, probe data collected may not be sent to or transmitted to a processing, central, or data collection facility. For example, the data collected may be used to update data for the device that collected the data, and so only the collecting device is updated. In one embodiment, the device may include components, applications, and/or logic to compare the probe data with map data and generate new or modified geographic data or attributes. Also, that device can share the collected probe data and/or updates with other devices, such as in a community.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and non-volatile storage media. The functions, acts, steps, or tasks illustrated in the figures or described herein are executed in response to one or more sets of logic or computer-executable instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A method comprising:
   receiving, at a physical disability device, data indicative of a destination;
   detecting a type of physical disability based on motion associated with the physical disability device;
   calculating, by a processor, a route based on the type of physical disability and the data indicative of the destination; and
   providing the route at the physical disability device.

2. The method of claim 1, wherein the physical disability device is selected from a group comprising a wheelchair, one or more crutches, and a walking stick.

3. The method of claim 1, wherein providing the route comprises:
   displaying the route associated with the type of physical disability.

4. The method of claim 1, wherein the motion is based on walking with crutches, riding in a wheelchair, walking with a limp, or walking with a walking stick.

5. The method of claim 1, wherein the motion is detected by one or more accelerometers.

6. The method of claim 1, wherein the type of physical disability is selected from a group comprising sight impaired or hearing impaired.

7. An apparatus comprising:
   at least one processor; and
   at least one memory including computer program code for one or more programs, the at least one memory and the computer program code configured to, with the at least one processor, cause the apparatus to perform at least the following:
   receiving, at a physical disability device, data indicative of a location;
   detecting a type of physical disability based on motion associated with the physical disability device;
   calculating a route based on the physical disability and the data indicative of the location; and
   providing the route at the physical disability device.

8. The apparatus of claim 7, wherein the physical disability device is selected from a group comprising wheelchair, crutches, and walking stick.

9. The apparatus of claim 7, wherein providing the route comprises:
displaying the route associated with the type of physical disability.

10. The apparatus of claim 7, wherein the motion is based on accelerometer data indicative of walking with crutches, riding in a wheelchair, walking with a limp, or walking with a walking stick.

11. The apparatus of claim 7, wherein the type of physical disability is selected from a group comprising sight impaired or hearing impaired.

12. A non-transitory computer readable medium including instructions that when executed are operable to:
detect a type of physical disability based on motion associated with the physical disability device;
calculate a route based on the type of physical disability and a location; and
provide the route at the physical disability device to a sight impaired user.

13. The non-transitory computer readable medium of claim 12, wherein the physical disability device is selected from a group comprising a wheelchair, crutches, and a walking stick.

14. The non-transitory computer readable medium of claim 12, wherein the motion is based on data indicative of walking with crutches, riding in a wheelchair, walking with a limp, or walking with a walking stick.

15. The non-transitory computer readable medium of claim 12, the instructions that when executed are operable to:
receive accelerometer data for the physical disability.

* * * * *